Figure 3:
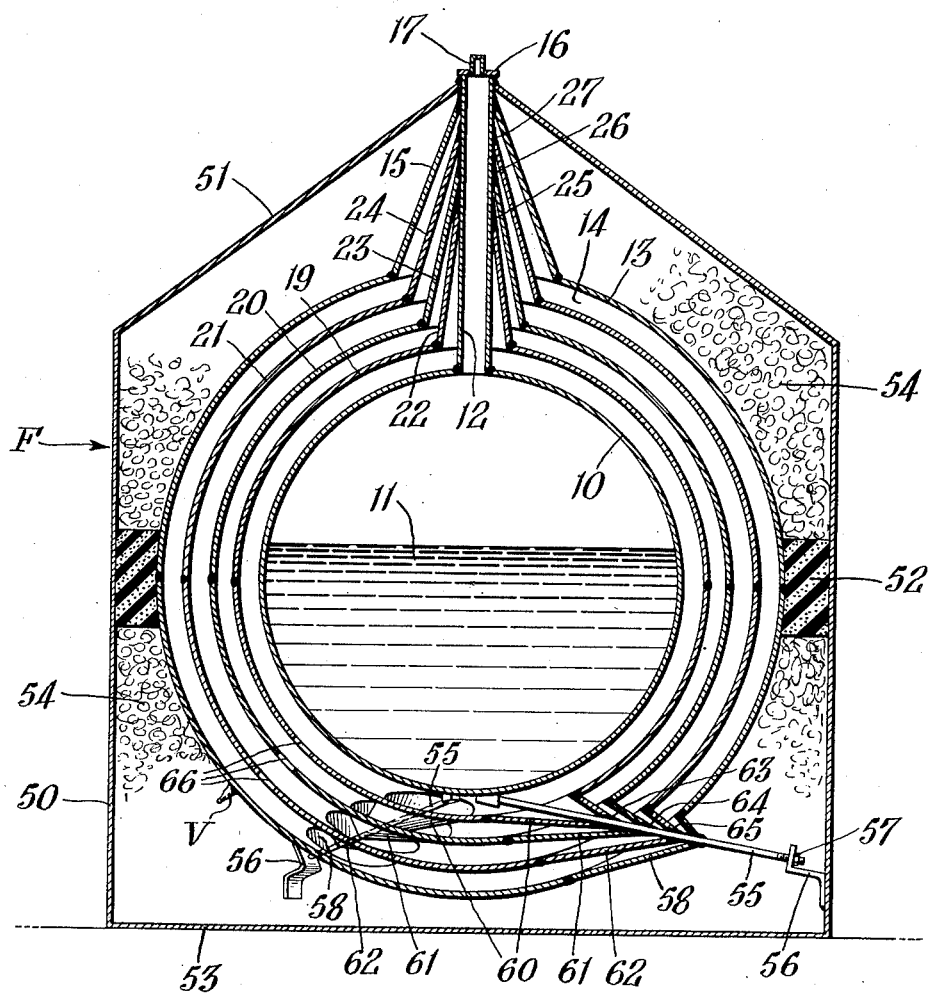

June 23, 1953  W. D. CORNELL  2,643,022
RADIATION SHIELD SUPPORTS IN VACUUM INSULATED CONTAINERS
Filed Aug. 15, 1947  2 Sheets-Sheet 1
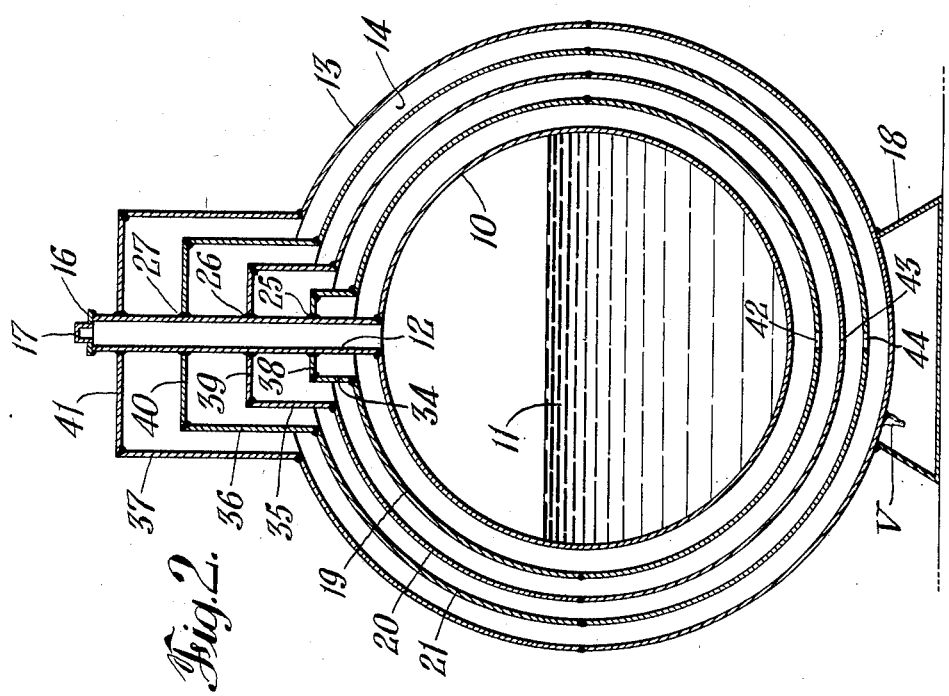
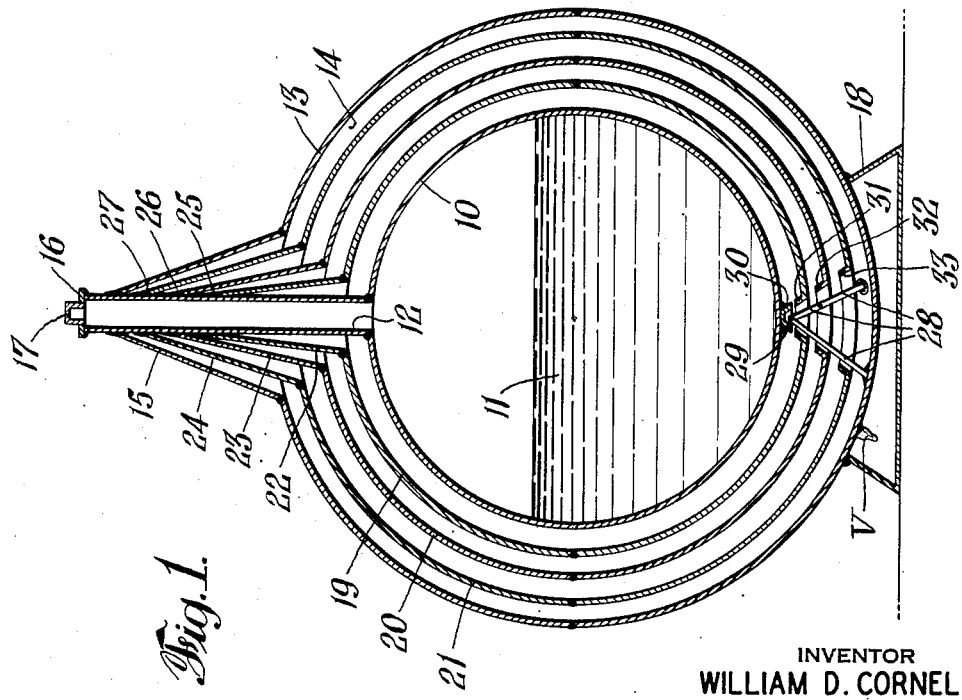
INVENTOR
WILLIAM D. CORNELL
BY
ATTORNEY Patented June 23, 1953

2,643,022

UNITED STATES PATENT OFFICE 2,643,022

RADIATION SHIELD SUPPORTS IN VACUUM INSULATED CONTAINERS

William D. Cornell, Buffalo, N. Y., assignor, by mesne assignments, to Union Carbide and Carbon Corporation, a corporation of New York Application August 15, 1947, Serial No. 768,859

5 Claims. (Cl. 220—15)

This invention relates to vacuum-insulated containers and more particularly to improved radiation shield supports for straight vacuum-insulated containers adapted to preserve very cold fluids such as liquid oxygen, nitrogen, etc.

Small-sized vessels and particularly portable containers for holding liquefied gas are usually of the vacuum-insulated type because effective porous material type heat insulation needs to be very thick and the resulting container would be too bulky and heavy. The customary vacuum-insulated container employs highly polished surfaces on the outer wall of the inner vessel and inner wall of the outer shell to control heat transfer by radiation which is the chief mode of heat transfer across a highly evacuated space. Even with the best of reflective surfaces, however, the heat leak is still appreciable, so that attempts have been made to reduce the heat transfer by radiation still more by the insertion of additional radiation shields between the inner vessel and the outer shell. Theoretically the decrease in heat leak is proportional to the number of spaces produced by the radiation shields in the vacuum space between the inner vessel and outer shell. One shield, highly polished on both sides, should halve the radiation heat leak and two such shields, providing three spaces, should reduce the heat leak to one-third of its value when no shields are used.

Little practical use of multiple-radiation shields has been made because of difficulties resulting from the necessity of supporting the radiation shields in spaced relation in the vacuum space. With supports heretofore proposed, the gain of insulation efficiency was largely offset by heat leak due to conduction of heat through the shield-supporting means.

Principal objects of the present invention are therefore to provide an improved vacuum insulated container with a radiation shield or shields interposed in the vacuum space arranged and supported in such a manner that heat leak is reduced to a minimum, and particularly to provide an arrangement of radiation shield supports such that the temperature assumed by each shield is substantially uniform throughout the entire shield when the inner vessel of a container holds, for example, a low boiling point liquefied gas such as liquid oxygen, nitrogen, argon, or hydrogen.

These and other objects and novel features of the invention will become apparent from the following description having reference to the annexed drawings, in which:

Figs. 1, 2, and 3 are semi-diagrammatic views of cross-sections through exemplary liquefied gas holding containers illustrating three embodiments of radiation shield constructions according to the principles of the invention.

According to the present invention it has been discovered that the heat leak due to conduction through supports will be least when the shield-supporting arrangement is such that the temperature of the shield is substantially uniform. If the inner vessel of a vacuum-insulated container holds liquefied gas such as oxygen at atmospheric pressure, the temperature of the inner vessel will be —183° C. while that of the outer shell may be atmospheric temperature, or about 20° C., and the temperature difference across the vacuum space will be over 200° C. If a radiation shield is positioned in the vacuum space to divide it into two spaces, such shield will tend to assume a temperature intermediate between —183° C. and 20° C. Such intermediate temperature is not necessarily the mean temperature but is usually higher.

In vacuum-insulated containers it is necessary to support the inner vessel and its liquid load from the outer shell and such support is usually provided by suspending it on a neck tube that serves also as a filling opening. Except under certain special conditions, such neck tube unavoidably conducts heat and is therefore elongated and made of thin metal to reduce the heat conduction. The exception indicated may occur when the vaporization of liquid in the inner vessel is at such a rate that the vapors flowing out through the neck tube have sufficient refrigeration to absorb the heat tending to be conducted down tube to the inner vessel. Due to conduction of heat down the neck tube, a temperature gradient exists along the tube and, according to the invention, a position along the tube is selected which has the same temperature as the intermediate temperature assumed by the radiation shield and the radiation shield support is secured to the neck tube at such selected position. Since both ends of the radiation shield support are then at the same temperature, no heat will be conducted through the support. If, however, the shield support were secured at a colder region of the neck tube, radiant heat collected by the shield would flow toward the neck tube and thus increase the heat leak toward the inner vessel. If, on the other hand, the shield support were secured at a warmer region of the neck tube, heat would flow from the outer part of the neck tube through the shield support to the shield and such heat would be transferred by radiation toward the inner vessel. The principles of this invention are applicable to any type of inner vessel supporting organization and are applied in the embodiments illustrated to the elongated neck tube type of support and to the load rod type of support (Fig. 3).

Referring now to the drawings and particularly to Fig. 1, the vacuum-insulated container comprises an inner vessel 10 preferably of spherical form since this shape provides the smallest surface for a given volume. The inner vessel 10 holds a body of liquefied gas 11 and is provided with an upwardly extending neck tube 12. Completely surrounding the inner vessel 10 is an outer shell 13 which is spaced a suitable distance from the inner vessel to provide an insulating space 14. The outer shell has a conical extension 15 at its upper end which is sealed to the upper end of the neck tube and thus forms a support for the neck tube so that the inner vessel is suspended by the neck tube and supported by the outer shell. The upper end of the neck tube 12 may be closed by a cap 16 preferably provided with a vent opening 17. A foot ring 18 is also preferably provided at the bottom of the outer shell to form a stand for the vessel.

In accordance with the present invention the space 14 is highly evacuated and the inner surface of the shell 13 as well as the outer surface of the inner vessel 10 are highly polished to provide highly reflective surfaces in order to reduce heat transfer by radiation. The heat transfer is further reduced according to the invention by the provision of one or more radiation shields interposed in the vacuum space. Any number of radiation shields desired may be employed as previously indicated. As shown in the drawings, three such shields 19, 20, and 21 are provided since it is found that the heat transfer reduction is then very effective and the gain by introducing still more shields may not be commensurate with the cost of producing the container. These shields 19, 20, and 21 are similar in form to the inner vessel and outer shell and are graduated in size so that they do not touch each other or the inner vessel and outer shell and provide four intervening spaces, all of which are highly evacuated. Each of the shields 19, 20, and 21 is highly polished on both inner and outer surfaces.

It is necessary to support the shields in the position shown and in a manner such that heat transferred due to the supporting means is not increased. The support is accomplished in Fig. 1 by the provision of conical extensions 22, 23, and 24 from the upper part of each respective shield 19, 20, and 21 extending upwardly within the outer conical extension 15 and having their inner or small ends secured to the neck tube 12. In normal use the neck tube will have a temperature gradient therealong which at the lower end ranges from a temperature nearly equal to that of the liquefied gas 11, to the upper end which has a temperature about equal to that of the atmosphere. In normal operation the shields 19, 20, and 21 will assume different temperatures which are intermediate between the temperature of the liquefied gas 11 and the temperature of the outer shell 13 which is substantially atmospheric. Thus it is possible to choose points along the neck tube 12 which have the same temperature as the respective shields 19, 20, and 21. As illustrated in Fig. 1, such points are at 25, 26, and 27 respectively, the point 25 being at the same temperature as the shield 19. The conical extensions 22, 23, and 24 are therefore secured to the neck tube 12 at such points 25, 26, and 27, thus no flow of heat can occur through the conical extensions 22, 23, and 24.

In a vessel for stationary use, no other support for the inner vessel and the shields would be necessary, but since a container of the present type is usually employed in portable service, a means for controlling side sway of the inner vessel may be provided. One such side-sway controlling means is illustrated in Fig. 1 and comprises three rods 28 arranged in the form of a tripod, the rods being secured together at an apex near to but not touching the bottom of the inner vessel 10 and extending angularly outward and downward to the outer shell 13 to which the lower ends of the rods are secured by soldering or welding. The rods 28 are preferably constructed of a metal having low thermal conductivity and have a minimum cross-section consistent with the necessary strength, and also are made as long as conveniently possible, all for the purpose of reducing the conduction of heat therethrough. The apex 29 is disposed within a bumper cone 30 that is secured to the bottom of the inner vessel 10. Ordinarily there is no contact between the cone 30 and the apex 29 but the spacing is small so as to control side sway of the inner vessel.

The tripod rods 28 also serve to control excessive side sway of the shields 19, 20, and 21. To this end each shield is provided with a flanged opening in the bottom surrounding the tripods, thus openings 31, 32, and 33 respectively have a diameter sufficient to provide a small clearance about the tripods 28 so that the shields normally are not in contact with the rods 28, but the flanges of such openings will touch any one respective rod in the event that movement of the container causes the shields to move laterally. The openings 31, 32, and 33 through the shields also insure that all four portions of the vacuum space can be evacuated. For the purpose of evacuating the vacuum space, the outer shell 13 is provided with the usual sealable vacuum pump connection at V, and although not shown in the interest of clearness of drawing, the inner vessel may be provided on its outer surface with a pocket or blister to hold the customary adsorbent material which helps to maintain the vacuum at a high value.

In Figs. 2 and 3, parts which are similar to those shown and described with respect to Fig. 1 are designated by the same reference numerals. The container of Fig. 2 differs from that of Fig. 1 merely in the shape of the supporting means for the shields and by the omission of side-sway control means. Thus in Fig. 2 the upper ends of the shields 19, 20, and 21 are provided with cylindrical extensions or necks 34, 35, and 36 respectively disposed within a vertically extending neck 37 of the outer shell 13. The upper ends of each of the necks are closed by annular plates 38, 39, 40, and 41 respectively and the neck tube 12 passes through the center of each of the annular plates. The neck tube 12 at its upper end is sealed to the annular plate 41 of the neck 37 so that the inner vessel is suspended from the plate 41 which in turn is carried by the neck 37 of the outer shell 13. The annular plates 38, 39, and 40 are sealed to the neck tube 12 at the respective points 25, 26, and 27 where the temperature of the neck tube is the same as the temperature of the shields 19, 20, and 21.

For proper evacuation each shield is provided with a small opening therethrough at 42, 43, and 44.

Referring now to Fig. 3, the container is provided with inner vessel 10, outer shell 13, neck tube 12, radiation shields 19, 20, and 21, and shield-supporting means 22, 23, and 24 substantially similar to that of Fig. 1. In Fig. 3, however, the outer shell 13 is supported so that it carries substantially no load except the load due to its own weight and the external pressure of the atmosphere. Since the outer shell does not have to carry the weight of the inner vessel 10 and liquid 11 as it does in Fig. 1, it can be designed of lighter material. In Fig. 3, support for the entire container is provided by an external frame or casing F. The frame F includes a cylindrical portion 50 and a conical upper portion 51, the upper end of which is secured to the upper end of the neck tube 12. Thus the weight of the entire container when same is upright is supported by the conical portion 51. If desired, bumpers 52 of resilient material, such for example, as sponge rubber, may be provided between the sides of the shell 13 and the casing 50. Also, if desired, the casing 50 may have a bottom 53 and there may be a filling of insulating material 54 such as mineral wool disposed in the space between the shell 13 and the casing 50.

In the container of Fig. 3, side-sway controlling means is also provided in a form which transmits the load directly from the inner vessel to the outer frame or casing 50. To this end three side-sway rods 55 are provided having their inner ends anchored to the bottom of the inner vessel 10 and extending downwardly and laterally through the radiation shields 19, 20, 21, and through the outer shell 13 to a bracket 56 which is welded to the frame or casing 50. Tension adjusting nuts 57 are preferably provided at the outer ends of the rods 55 to secure them to the brackets 56 in an adjustable manner. To seal the vacuum space and provide side-sway support for the outer shell 13, a conical extension 58 thereof is provided around each rod 55 and the outer ends of the extensions 58 are secured and sealed gastightly to the rods. Each shield is also preferably anchored to each rod by securing members preferably in the form of conical extensions 60, 61, and 62, the outer ends of which are secured to the rods 55 at respective points 63, 64, and 65, which points are selected to have the same temperature as the respective shields 19, 20, and 21. Since the conical extensions 60, 61, and 62 are merely for supporting purposes they need not be gastight, but could be perforated. If they are imperforate, suitable holes 66 through the shields are also provided in order that the four zones of the vacuum space can be evacuated.

The container embodiment as shown in Fig. 3 is particularly suitable for portable service such as use aboard airplanes, because the inner vessel is adequately supported when the vessel is disposed in any position. For such service, suitable devices for controlling the evaporation and discharge of liquid or gas would be mounted within the neck tube 12, but such apparatus is not illustrated because it forms no part of the present invention.

It will be understood that the principles of this invention may be embodied in other forms of vacuum insulated apparatus than that shown herein and that changes in the apparatus may be made without departing from the spirit and scope of the invention. For example, the rods 55 in Fig. 3 may be anchored solely in the outer shell 13, which would then be suitably reinforced, or the inner vessel may be suspended solely by load rods in a neckless type of container.

What is claimed is:

1. In a vacuum-insulated container having an inner vessel for holding a cold fluid such as a liquefied gas, an outer shell and an intervening vacuum space, a supporting means extending inwardly from said outer shell to said inner vessel so that there is a temperature gradient along said supporting means when the shell is exposed to an ambient atmospheric temperature of about 20° C. and said inner vessel is at the temperature of said cold fluid, at least one highly reflective radiation shield interposed in said vacuum space, and means securing such radiation shield to said supporting means at a region along the supporting means where the temperature is substantially the same as the temperature assumed by the shield intermediate said ambient atmospheric and cold fluid temperatures so that substantially no heat is conducted by the shield-securing means.

2. In a vacuum-insulated container having an inner vessel for holding a cold fluid such as a liquefied gas, an outer shell and an intervening vacuum space, a supporting means comprising a vertical neck tube extending inwardly from said outer shell to said inner vessel so that there is a temperature gradient along said supporting means when the shell is exposed to a preselected ambient atmospheric temperature and said inner vessel is at the temperature of said cold fluid, at least one highly reflective radiation shield interposed in said vacuum space, means securing such radiation shield to said supporting means at a region along the supporting means where the temperature is substantially the same as the temperature assumed by the shield intermediate said ambient atmospheric and cold fluid temperatures so that substantially no heat is conducted by the shield-securing means, and side-sway controlling means comprising a plurality of angularly disposed members having upper ends secured together and legs extending to the outer shell, said shield having an opening about said angularly disposed members providing a limited degree of clearance between the shield and said angularly disposed members.

3. In a vacuum-insulated container having an inner vessel for holding a cold fluid such as a liquefied gas, an outer shell and an intervening vacuum space, a supporting means comprising a vertical neck tube extending inwardly from said outer shell to said inner vessel so that there is a temperature gradient along said supporting means when the shell is exposed to a preselected ambient atmospheric temperature and said inner vessel is at the temperature of said cold fluid, at least one highly reflective radiation shield interposed in said vacuum space, means securing such radiation shield to said supporting means at a region along the supporting means where the temperature is substantially the same as the temperature assumed by the shield intermediate said ambient atmospheric and cold fluid temperatures so that substantially no heat is conducted by the shield-securing means, side-sway controlling means comprising a tripod arrangement of elongated members having lower ends secured to spaced points of the bottom of the outer shell and an apex adjacent to but not touching the inner vessel, an annular bumper secured to the bottom of the inner vessel around but normally not touching said apex, and said shield having an opening about said elongated members for providing a limited degree of clearance between the shield and said members.

4. In a vacuum-insulated container having an inner vessel for holding a cold fluid such as a liquefied gas, an outer shell and an intervening vacuum space, a supporting means extending inwardly from said outer shell to said inner vessel so that there is a temperature gradient along said supporting means when the shell is exposed to a preselected ambient atmospheric temperature and said inner vessel is at the temperature of said cold fluid, at least one highly reflective radiation shield interposed in said vacuum space, means securing such radiation shield to said supporting means at a region along the supporting means where the temperature is substantially the same as the temperature assumed by the shield intermediate said ambient atmospheric and cold fluid temperatures so that substantially no heat is conducted by the shield-securing means, side-sway controlling means comprising angularly disposed load rods having their inner ends anchored to the bottom of the inner vessel and extending to and secured gastightly to the wall of said outer shell; and a shield support extending from said shield to each of said load rods and anchored to said load rods at points where the temperature of the rod is substantially the same as the temperature assumed by the shield intermediate between said cold fluid and said ambient atmospheric temperatures.

5. In a vacuum-insulated container having an inner vessel for holding a cold fluid such as a liquefied gas, an outer shell and an intervening vacuum space, a supporting means extending inwardly from said outer shell to said inner vessel so that there is a temperature gradient along said supporting means when the shell is exposed to a preselected ambient atmospheric temperature and said inner vessel is at the temperature of said cold fluid, at least one highly reflective radiation shield interposed in said vacuum space, means securing such radiation shield to said supporting means at a region along the supporting means where the temperature is substantially the same as the temperature assumed by the shield intermediate said ambient atmospheric and cold fluid temperatures so that substantially no heat is conducted by the shield-securing means, sideway controlling means comprising angularly disposed load rods having their inner ends anchored to the bottom of the inner vessel and their outer ends secured to a supporting frame; means for sealing said outer shell to each load rod; and a shield support extending from said shield to each of said load rods and anchored to said load rods at points where the temperature of the rod is substantially the same as the temperature assumed by the shield intermediate between said cold fluid and said ambient atmospheric temperatures.

WILLIAM D. CORNELL.

References Cited in the file of this patent

UNITED STATES PATENTS

| Number | Name | Date |
|---|---|---|
| 1,566,221 | Lindemuth | Dec. 15, 1925 |
| 1,993,730 | Carpenter | Mar. 12, 1935 |
| 2,396,459 | Dana | Mar. 12, 1946 |

FOREIGN PATENTS

| Number | Country | Date |
|---|---|---|
| 169,725 | Great Britain | Dec. 28, 1922 |
| 241,466 | Great Britain | Oct. 22, 1925 |
| 499,438 | France | Nov. 19, 1919 |